(12) United States Patent
Bang et al.

(10) Patent No.: US 7,653,092 B2
(45) Date of Patent: Jan. 26, 2010

(54) TIME-DIVISION MULTIPLEXING/DEMULTIPLEXING SYSTEM AND METHOD

(75) Inventors: Joon Hak Bang, Daejeon (KR); Hyun Woo Cho, Daejeon (KR); Sang Kyu Lim, Daejeon (KR); Wang Joo Lee, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 375 days.

(21) Appl. No.: 11/406,105

(22) Filed: Apr. 18, 2006

(65) Prior Publication Data

US 2007/0071039 A1    Mar. 29, 2007

(30) Foreign Application Priority Data

Sep. 28, 2005 (KR) .................. 10-2005-0090733
Dec. 15, 2005 (KR) .................. 10-2005-0124052

(51) Int. Cl.
*H04J 3/06* (2006.01)
*H04J 3/04* (2006.01)

(52) U.S. Cl. .................. 370/503; 370/535
(58) Field of Classification Search .............. 370/503, 370/535
See application file for complete search history.

(56) References Cited

U.S. PATENT DOCUMENTS

| | | | | |
|---|---|---|---|---|
| 4,616,195 | A * | 10/1986 | Ward et al. | 333/160 |
| 5,459,442 | A * | 10/1995 | James | 333/156 |
| 5,909,473 | A * | 6/1999 | Aoki et al. | 375/373 |
| 6,118,564 | A * | 9/2000 | Ooi et al. | 398/35 |
| 6,178,022 | B1 * | 1/2001 | Yoneyama | 398/182 |
| 6,204,732 | B1 * | 3/2001 | Rapoport et al. | 331/2 |
| 6,633,590 | B1 * | 10/2003 | Garofalo et al. | 370/507 |
| 6,693,931 | B1 * | 2/2004 | Mendenhall et al. | 372/29.023 |
| 6,798,790 | B1 * | 9/2004 | Enssle et al. | 370/503 |
| 6,931,213 | B2 * | 8/2005 | Desurvire | 398/175 |
| 6,990,159 | B1 * | 1/2006 | Balb et al. | 375/354 |
| 7,397,875 | B2 * | 7/2008 | Primrose et al. | 375/354 |

(Continued)

FOREIGN PATENT DOCUMENTS

KR    19950005614    5/1995

OTHER PUBLICATIONS

'40 Gb/s TDM Transponder for Accommodation STM-64 and OTU2' Bang et al., The 12$^{th}$ Conference on Optoelectronics and Optical Communications, vol. 12, No. 1, May 11, 2005.

*Primary Examiner*—Kevin C Harper
*Assistant Examiner*—Steven Wood
(74) *Attorney, Agent, or Firm*—Ladas & Parry LLP

(57) ABSTRACT

Provided are a time-division data multiplexing/demultiplexing system and method capable of preventing errors in processing data signals which occur due to a phase difference between data signals and a multiplexing reference clock in a multiplexing process or a phase difference between a multiplexed data signal and a demultiplexing reference clock in a demultiplexing process. The time-division data multiplexing system includes: a phase adjusting unit which adjusts a phase of each of a plurality of data signals having different phases from one another for enabling the data signals to be time-division multiplexed when a plurality of values of the data signals indicate a stable state; and a multiplexer time-division multiplexing the phase adjusted data signals according to a multiplexing reference clock.

4 Claims, 4 Drawing Sheets

U.S. PATENT DOCUMENTS

| | | | |
|---|---|---|---|
| 7,558,449 B2* | 7/2009 | Clapp | 385/24 |
| 2003/0076198 A1* | 4/2003 | Phillips et al. | 333/161 |
| 2003/0179783 A1* | 9/2003 | Uekama et al. | 370/535 |
| 2004/0062279 A1* | 4/2004 | Primrose et al. | 370/503 |
| 2004/0109420 A1* | 6/2004 | Meghelli | 370/321 |
| 2004/0202203 A1* | 10/2004 | Kolze et al. | 370/503 |
| 2005/0041691 A1* | 2/2005 | Laufer et al. | 370/503 |
| 2005/0232219 A1* | 10/2005 | Aiello et al. | 370/348 |
| 2007/0116059 A1* | 5/2007 | Hipp | 370/503 |
| 2007/0274348 A1* | 11/2007 | Friedman et al. | 370/503 |

* cited by examiner

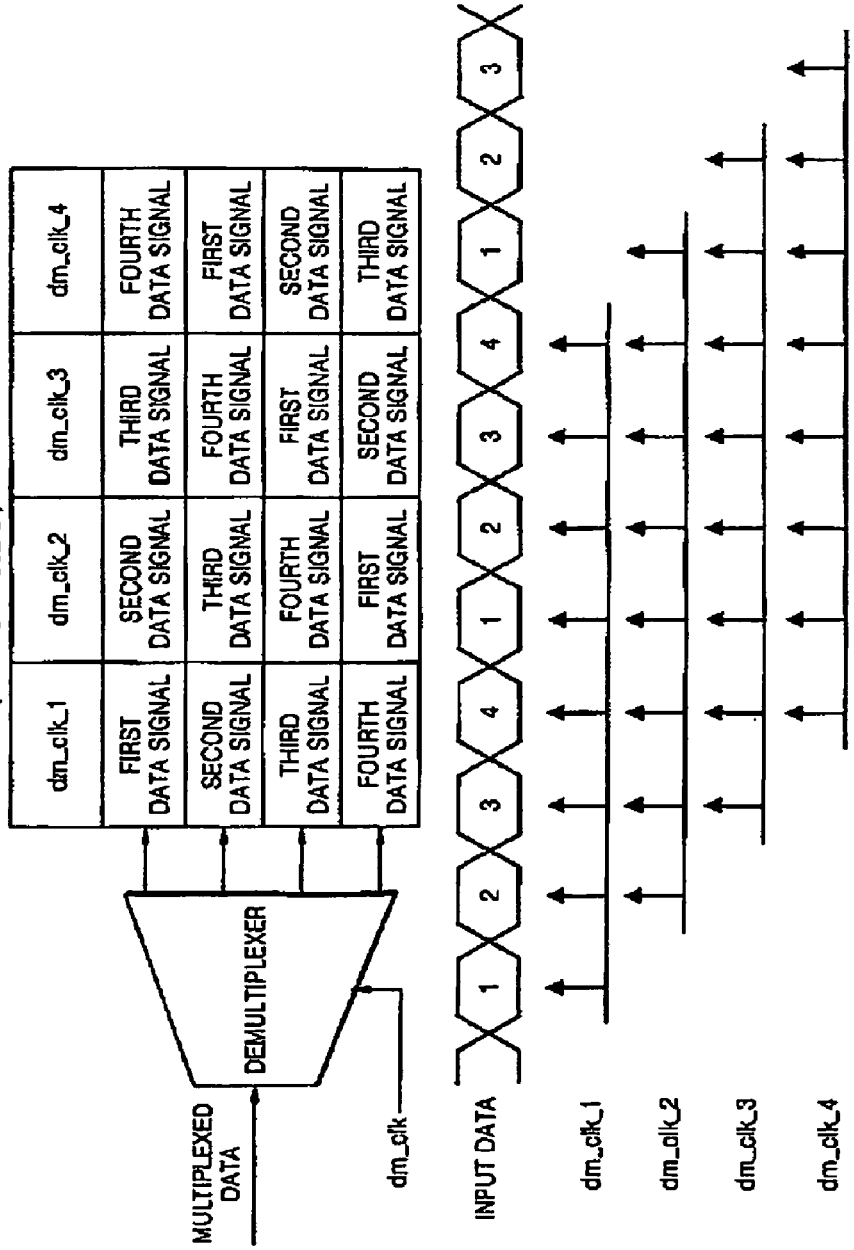

TIME-DIVISION MULTIPLEXING/DEMULTIPLEXING SYSTEM AND METHOD

CROSS-REFERENCE TO RELATED PATENT APPLICATION

This application claims the benefit of Korean. Patent Application Nos. 10-2005-0090733, filed on Sep. 28, 2005 and 10-2005-0124052, filed on Dec. 15, 2005, in the Korean Intellectual Property Office, the disclosures of which are incorporated herein in their entirety by reference.

BACKGROUND OF THE INVENTION

1. Field of the Invention

The present invention relates to a time-division data multiplexing/demultiplexing system and method, and more particularly, to a time-division data multiplexing/de-multiplexing system and method capable of preventing errors which may occur in processing data signals due to a phase difference between each of a plurality of data signals and a multiplexing reference clock in time-division multiplexing a plurality of data signals or a phase difference between a multiplexed data signal and a demultiplexing reference clock in de-multiplexing the multiplexed data signal into individual data signals.

2. Description of Related Art

Data transmission technology has progressed from an analog transmission scheme to a digital transmission scheme. Initially an analog transmission scheme in which a channel of analog data per transmission line was transmitted was used. After that, an advanced analog transmission scheme using frequency division multiplexing was introduced as filter theories and vacuum tubes were developed. However, these analog transmission schemes have a limitation in frequency bands and difficulties in long distance transmission of high capacity data due to characteristics of analog data. Therefore, digital transmission schemes have been developed to solve these problems.

As a digital transmission scheme, a pulse code modulation scheme was developed. After that, advanced digital transmission schemes such as, high-bit-rate digital transmission systems using a time-division multiplexing scheme have been introduced. For the time-division multiplexing scheme, high-speed digital transmission lines have been used as digital data multiplexers. The time-division multiplexers include products for wide-band integrated switched data as well as satellite transmission and an integrated switched data network, and the applications of the time-division multiplexers are increasing more and more.

Generally, when a plurality of data signals are time-division multiplexed into a single data signal, an error in the multiplexing process may occur due to a phase difference between the data signals. In addition, when the data which has been time-division multiplexed is demultiplexed into a plurality of data signals, the order of the data signals may arbitrarily change according to a phase of a demultiplexing reference clock.

SUMMARY OF THE INVENTION

The present invention provides a time-division data multiplexing/demultiplexing system and method in which a phase of each of a plurality of data signals and a multiplexing reference clock are matched by adjusting phases of the plurality of the data signals respectively in multiplexing, and an order of the plurality of data signals which have been demultiplexed is maintained by adjusting a phase of a demultiplexing reference clock.

According to an aspect of the present invention, there is provided a time-division data multiplexing system comprising: a phase adjusting unit which adjusts a phase of each of data signals for enabling the data signals to be time-division multiplexed when a plurality of values of the data signals having different phases from one another indicate a stable state; and a multiplexer time-division multiplexing the phase adjusted data signals according to a multiplexing reference clock.

According to another aspect of the present invention, there is provided a time-division data demultiplexing system comprising: a phase adjusting unit which adjusts a phase of a de-multiplexing reference clock for maintaining an order of time-division de-multiplexing a multiplexed data signal; and a demultiplexer demultiplexing the multiplexed data signal according to the phase adjusted reference clock.

According to another aspect of the present invention, there is provided a time-division data multiplexing method comprising: adjusting a phase of a plurality of data signals having different phases from one another for enabling the data signals to be time-division multiplexed when a plurality of values of the data signals indicate a stable state; and time-division multiplexing the phase-adjusted data signals according to a multiplexing reference clock.

According to another aspect of the present invention, there is provided a time-division data demultiplexing method comprising: adjusting a phase of a demultiplexing reference clock for maintaining an order of time-division demultiplexing a multiplexed data signal; and de-multiplexing the multiplexed data signal according to the phase adjusted de-multiplexing reference clock.

BRIEF DESCRIPTION OF THE DRAWINGS

The above and other features and advantages of the present invention will become more apparent by describing in detail exemplary embodiments thereof with reference to the attached drawings in which:

FIG. 2A is a timing diagram of data signals and a demultiplexing reference clock in a conventional time-division de-multiplexing system;

DETAILED DESCRIPTION OF THE INVENTION

Figure 1A:
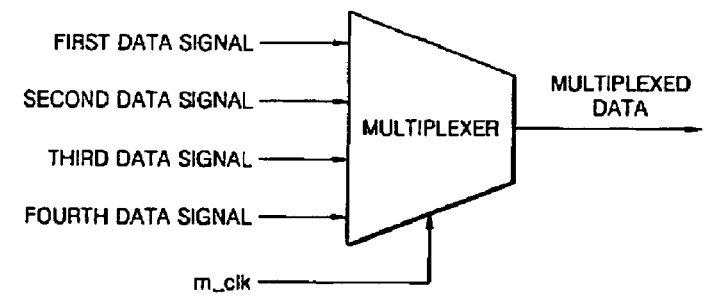
FIG. 1A is a timing diagram of data signals and a multiplexing reference clock in a conventional time-division multiplexing system.
Figure 1A:
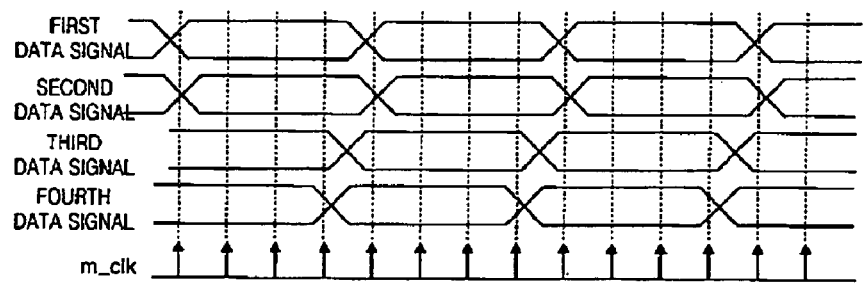

Embodiments of the present invention will now be described in detail with reference to the accompanying drawings. Like reference numerals denote like elements in the drawings. When an embodiment of the present invention is described with reference to a drawing, an element in one of the other drawings may be referenced.

FIG. 1A is a timing diagram of data signals and a multiplexing reference clock in a conventional time-division multiplexing system.

A frequency of the multiplexing reference clock m_clk which is provided to operate a multiplexer is N times a bit rate of data signals, wherein N denotes the number of signals to be multiplexed. Phases of input data signals and the multiplexing reference clock m_clk are illustrated in FIG. 1A. Since the input data signals are transmitted from different sources, the phases of the input data signals are different from each other. Accordingly, a phase of an input data signal such as a first data signal and a fourth data signal may be unsuitable to the phase of the multiplexing reference clock m_clk.

When the phase of the multiplexing reference clock m_clk is unsuitable to a phase of an input data signal, a data signal may be taken in an unstable state, that is, a transition state in which the data is transitioned from '0' to '1' or from '1' to '0', other than in a stable state in which the data is '0' or '1', according to the reference clock m_clk. As a result, a data recognition error by which the data is not correctly recognized may occur.

Figure 1B:
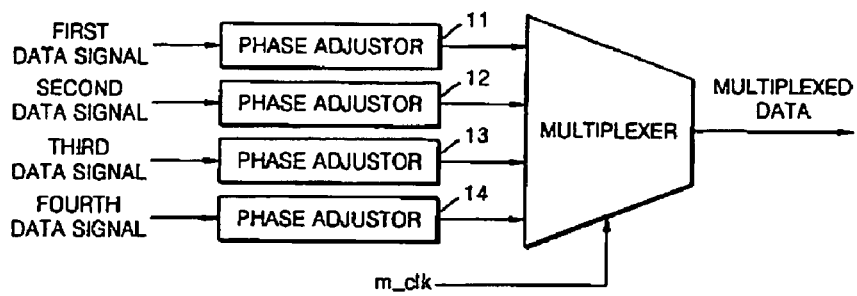
FIG. 1B is a block diagram illustrating a time-division data multiplexing system according to an embodiment of the present invention.

FIG. 1B is a block diagram illustrating a time-division multiplexing system according to an embodiment of the present invention.

According to the current embodiment of the present invention, as illustrated in FIG. 1B, phases of input data signals are adjusted by phase adjustors 11 to 14 in a time-division multiplexing process. As illustrated in FIG. 1A, the input data signals have an arbitrary phase difference therebetween. Therefore, when the phase of the multiplexing reference clock m_clk does is unsuitable to the phases of the input data signals in the time-division multiplexing process, errors may occur.

In order to solve this problem, according to the current embodiment of the present invention, the phases of the data signals are adjusted by using the phase adjustors 11 to 14 provided to input terminals respectively, so that phases of the data signals are suitable to the phase of the multiplexing reference clock. In other words, the phase controllers 11 to 14 adjust the phases of the data signals respectively, so that the data signals can be taken in a stable state of "0" or "1", other than in a transition state, according to the multiplexing reference clock m_clk. A phase adjustment scheme will be described below in detail.

FIG. 2A is a timing diagram of data signals and a demultiplexing reference clock in a conventional time-division demultiplexing system.

A frequency of a demultiplexing reference clock dm_clk which is provided to operate a demultiplexer is equal to a bit rate of a data signal. Phases of the input multiplexed data signal and the demultiplexing reference clock dm_clk are illustrated in FIG. 2A.

A phase difference between the input multiplexed data signal which has been transmitted from an external source and the demultiplexing reference clock dm_clk may change arbitrarily. As illustrated in FIG. 2A, the input multiplexed data signal is demultiplexed based on demultiplexing reference clocks dm_clk_1 to dm_clk_4. Here, the demultiplexing reference clocks dm_clk_1 to dm_clk_4 have different phases from each other. As illustrated in the table of FIG. 2A, according to an arbitrary change of the phase difference, an order of the input multiplexed data signals to be demultiplexed may change arbitrarily.

Figure 2B:
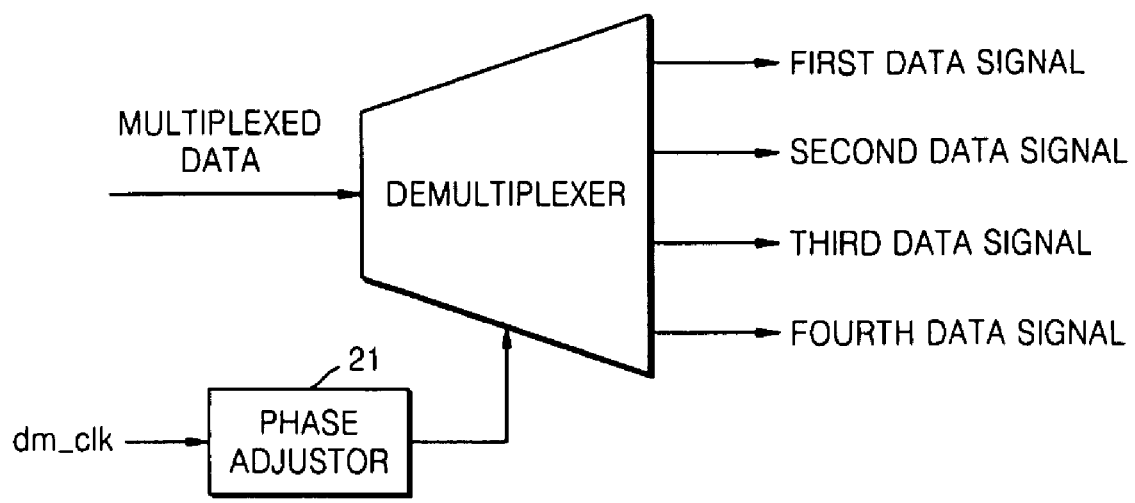
FIG. 2B is a block diagram illustrating a time-division data demultiplexing system according to an embodiment of the present invention.

FIG. 2B is a block diagram illustrating a time-division demultiplexing system according to an embodiment of the present invention.

As illustrated in FIG. 2B, the phase of a demultiplexing reference clock dm_clk is adjusted by a phase adjustor 21 of the de-multiplexing reference clock dm_clk according to an embodiment of the present invention. As illustrated in FIG. 2A, since the input multiplexed data signal has an arbitrary phase difference with the demultiplexing reference clock dm_clk, an order of the data signals to be demultiplexed changes arbitrarily in the demultiplexing process according to the phase of the input multiplexed data signal in relation to the demultiplexing reference clock dm_clk.

The phase adjustor 21 is provided to an input terminal of the demultiplexing reference clock dm_clk to adjust the phase of the demultiplexing reference clock dm_clk, so that the order of demultiplexing the input multiplexed data signal is maintained consistently. For example, there is a case where a second data signal which must be output to a second output port may be output to a first output port to which only a first data signal is always output due to a change of the phase of the input data signal. In this case, the phase adjustor 21 adjusts the phase of the demultiplexing reference clock dm_clk, so that the first data signal is always output to the first demultiplexing port.

Figure 3:
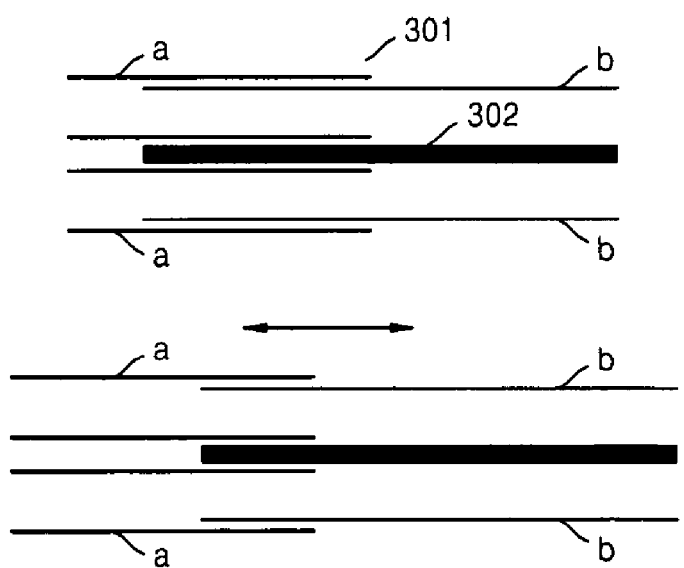
FIG. 3 is a diagram illustrating a phase adjuster according to an embodiment of the present invention.

FIG. 3 is a diagram illustrating an example of the phase adjustors 11, 12, 13, 14, and 21 according to an embodiment of the present invention.

The phase adjustment process is performed by changing a physical length of a transmission line 301 through which signals pass. When the physical length of the transmission line changes, the phases of the signals passing through the transmission line also change.

As illustrated in FIG. 3, the transmission line 301 has a coaxial structure in which two metal coaxial lines a and b have a central conductor 302 in common. The individual input data signals in the multiplexing process and the demultiplexing reference clock in the demultiplexing process are transmitted through the central conductor 302 of the transmission line 301. The phases of the signals change arbitrarily by pushing or pulling one of the metal coaxial lines a and b, that is, moving one of the metal coaxial lines a and b to the left or right for lengthening or shortening the coaxial structure. A lengthened line is illustrated in a lower part of FIG. 3.

Figure 4:
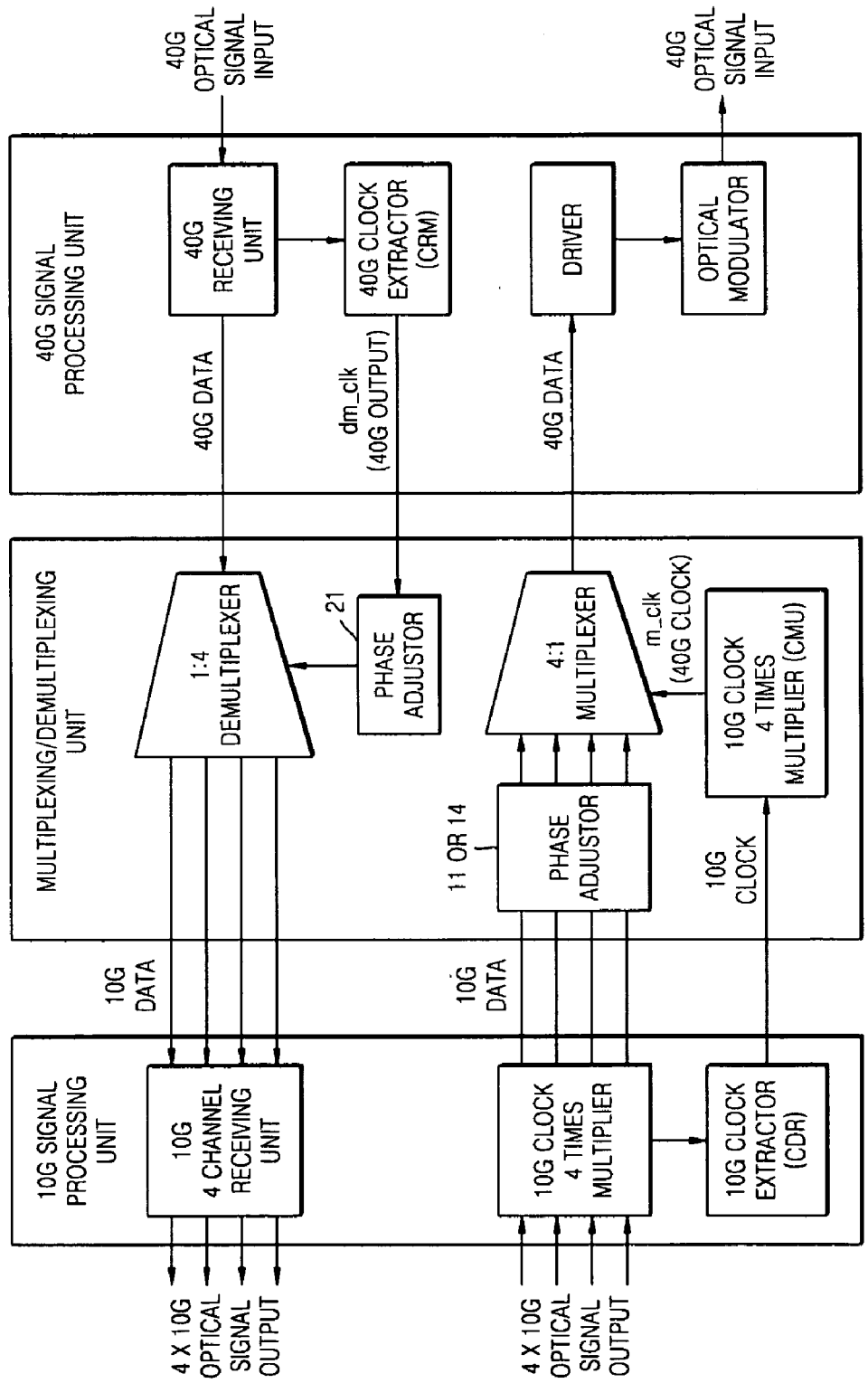
FIG. 4 is a block diagram illustrating an optical transponder according to an embodiment of the present invention.

FIG. 4 is a block diagram illustrating an optical transponder according to an embodiment of the present invention.

In the time-division multiplexing process, a 10 G 4-channel receiving unit receives four optical signals of 10 Gb/s and performs an opto-electric conversion. A 4:1 multiplexer generates an electric signal of 40 Gb/s "40 G DATA" by time-division multiplexing four electric signals of 10 Gb/s and performs an electro-optic conversion process.

The four optical signals of 10 Gb/s which are input from an external source are converted into electric signals by the 10 G 4-channel receiving unit. The phases of the converted electric signals of 10 Gb/s are adjusted by the phase controllers 11 to 14 and input to the 4:1 multiplexer MUX. A 10 GHz clock is extracted from a 10 Gb/s electric signal by a 10 G clock extractor CDR and then multiplied 4 times by a 10 G clock 4 times multiplier unit such as a clock multiplier unit (CMU) to generate the multiplexing reference clock m_clk (40 G CLOCK). The multiplexing reference clock m_clk is transmitted to the 4:1 multiplexer MUX. The four 10 G DATA signals which have been input to the 4:1 multiplexer MUX are multiplexed into a 40 G DATA signal. An optical modulator performs the electro-optic conversion on the 40 G DATA signal, modulates the optical signal and outputs the modulated signal to an optical link.

In the time-division demultiplexing process, a 40 G receiving unit receives the 40 Gb/s optical signal transmitted from the optical link, performs an opto-electric conversion of the 40 Gb/s optical signal into a 40 GB/s electric signal, and transmits the 40 Gb/s electric signal "40 G DATA" to the 1:4 demultiplexer DEMUX as an input thereof. A 40 G clock is extracted from the 40 GB/s electric signal by using a 40 G clock extractor (clock recovery module, CRM), adjusts a phase of the extracted 40 G clock by using the phase adjustor 21, and transmits the 40 G DATA to the 1:4 demultiplexer DEMUX.

The 40 G DATA which is input to the 1:4 demultiplexer DEMUX is demultiplexed into 4 signals of 10 G DATA. A 10 G 4-channel output unit performs the electro-optic conversion on the demultiplexed 4 signals of 10 G DATA and outputs 4 optical signals of 10 G "4×10 G OPTICAL SIGNAL".

A conventional time-division data multiplexing/de-multiplexing scheme may generate data recognition errors in a multiplexing process and may change an order of output data signals in a demultiplexing process. According to the present invention, these problems can be overcome by providing phase adjustors to input terminals in the multiplexing process and providing a phase adjustor to an input terminal of a demultiplexing reference clock dm_clk to adjust a phase of the demultiplexing reference clock dm_clk in the demultiplexing process.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), OD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A time-division data multiplexing system comprising:
a phase adjustor which adjusts a phase of each of a plurality of data signals having different phases from one another when a phase of a multiplexing reference clock is unsuitable to the phase of the respective data signal, for enabling the data signals to be time-division multiplexed when a plurality of values of the data signals indicate a stable state, and
wherein the multiplexing reference clock is unsuitable to the phase of the respective data signal if the data signal is in a transition state from a '0' to a '1' or a '1' to a '0', which is other than a stable state of a '0' or a '1'; and
a multiplexer time-division multiplexing having input terminals for receiving the phase adjusted data signals according to a multiplexing reference clock,
wherein each of the plurality of phase adjusted signals indicate the stable state when received at the multiplexer for each respective multiplexing reference clock,
wherein the phase adjustor is connected to an input terminal of the multiplexer for each of the data signals and has a coaxial structure in which two metal lines having a central conductor through which each of the data signals is transmitted, and the phase of each of the data signals is adjusted by moving one of the two metal lines right-to-left or left-to-right and thereby changing a physical length of the metal lines.

2. A time-division data demultiplexing system comprising:
a phase adjustor, adjustor which adjusts a phase of a demultiplexing reference clock for maintaining an order of time-division demultiplexing a multiplexed data signal; and
a demultiplexer demultiplexing the multiplexed data signal according to the phase adjusted reference clock for each respective multiplexed data signal inputted to the demultiplexer,
wherein the phase adjustor has a coaxial structure in which two metal lines having a central conductor through which the demultiplexing reference clock is transmitted and the phase of the demultiplexing clock is adjusted by moving one of the two metal lines right-to-left or left-to-right and thereby changing a physical length of the metal lines.

3. A time-division data multiplexing method comprising:
adjusting a phase of each of a plurality of data signals having different phases from one another by a phase adjustor, when a phase of a multiplexing reference clock is unsuitable to the phase of the respective data signal, for enabling the data signals to time-division multiplexed when a plurality of values of the data signals indicate a stable state, and
wherein the multiplexing reference clock is unsuitable to the phase of the data signal if the data signal is in a transition state from a '0' to a '1' or a '1' to a '0' which is other than a stable state of a '0' or a '1'; and
time-division multiplexing having input terminals for receiving the phase-adjusted data signals according to a multiplexing reference clock,
wherein each of the plurality of phase adjusted signals indicate the stable state for each time-division multiplexing reference clock,
wherein the phase adjustor is connected to an input terminal of the multiplexer for each of the data signals and has a coaxial structure in which two metal lines having a central conductor through which each of the data signals is transmitted and the phase of each of the data signals is adjusted by moving one of the two metal lines right-to-left or left-to-right and thereby changing a physical length of the metal lines.

4. A time-division data demultiplexing method comprising:
adjusting a phase of a demultiplexing reference clock for maintaining an order of time-division demultiplexing a multiplexed data signal from one another by a phase adjustor; and
demultiplexing the multiplexed data signal according to the phase adjusted demultiplexing reference clock for each respective multiplexed data signal inputted to a demultiplexer,
wherein the phase adjustor is connected to an input terminal of the multiplexer for each of the data signals and has a coaxial structure in which two metal lines having a central conductor through each of the data signals is transmitted, and the phase of each of the data signals is adjusted by moving one of the two metal lines right-to-left or left-to-right and thereby changing a physical length of the metal lines.

* * * * *